UNITED STATES PATENT OFFICE.

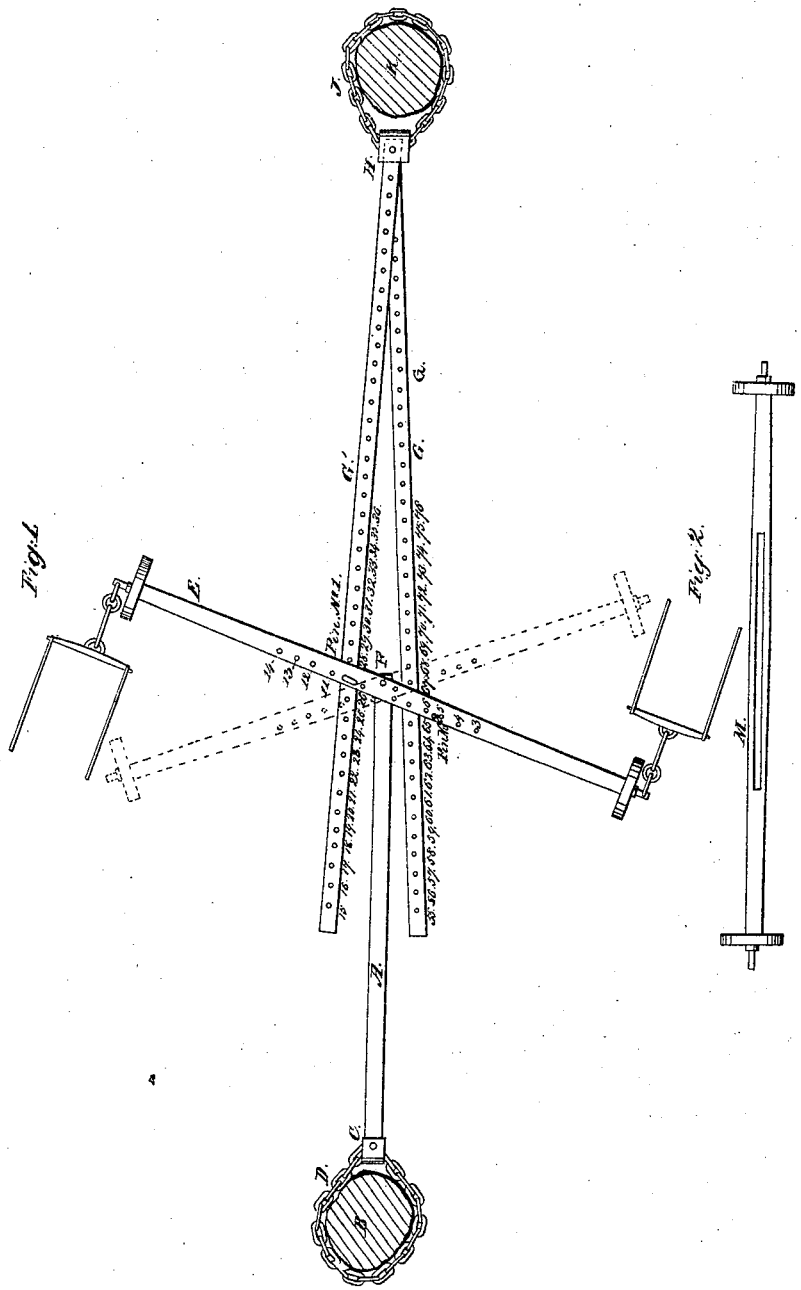
*E. Marble,*
*Stump Elevator.*
N° 1,900.    Patented Dec. 14, 1840.

ELEAZER MARBLE, OF WYALUSING, PENNSYLVANIA.

MACHINE FOR EXTRACTING STUMPS.

Specification of Letters Patent No. 1,900, dated December 14, 1840.

*To all whom it may concern:*

Be it known that I, ELEAZER MARBLE, of Wyalusing, in the county of Bradford and State of Pennsylvania, have invented a new and useful Machine for Extracting Stumps from the Earth, which is described as follows, reference being had to the annexed drawings of the same, making part of this specification.

Figure 1 is a top view of the machine ready for operation. Fig. 2 is a side view of the lever and axle of the truck showing the mortise therein.

Similar letters refer to similar parts in the figures.

This machine consists of a new combination of lever or axle and truck wheels, fulcrum rod, shifting bars, clevises, chains, &c., acting horizontally for drawing stumps.

The fulcrum rod A is about 14 feet long 2 inches wide and 1 inch thick and is fixed at one of its ends horizontally to a tree, post, stump, B or other permanent object by means of a clevis C and chain D or other suitable contrivance. The other end of said rod A is passed horizontally through an oblong opening or mortise M in the truck axle or lever E and is attached to it by means of a pin F passed vertically through the lever and rod which rod serving as the fulcrum.

Two horizontal perforated shifting bars G G' about 16 feet long 2 inches wide and 1 inch thick are united at their ends in the manner of a pair of tongs by a vertical pin H passed through them and through a clevis I which embraces them and through which clevis a chain J is passed and carried around and secured to the stump K to be drawn. The disunited ends of these horizontal perforated bars are passed through the mortise M of the truck axle or lever E which is also perforated vertically with a row of round openings the size of those in the shifting bars and which bars G G' are united to the axle or lever E by loose vertical pins passed through the lever and bars. In order to raise the axle or lever and bars from the ground and thereby avoid the friction which would be created by their rubbing over the earth a truck or wheel is put on each end of the lever. The power is applied at each end of the truck axle or lever in contrary directions and may be manual or horse. The traces for the horses or oxen are attached to the ends of the lever E. The bar G is not attached to the lever E by its vertical pin while the bar G' is acting. Only one bar acts at a time.

The operation is as follows. The machine being arranged and the chains made fast to the stump and the pin No. 1 inserted through the lever or axle E and bar G' for a strong purchase in order to start the stump the animals are driven forward the one from the stump and the other toward it, moving the lever or axle around on the center or fulcrum F until it is in the position represented by dotted lines; which operation will have started the stump from its bed; a pin is then inserted in hole No. 67 of bar G pin No. 1 being withdrawn and the power applied in a contrary direction which will bring the lever back to its first position. To draw the stump quicker with less power the bars must be opened wider and the pins inserted in the holes Nos. 3 or 4 of bar G' or 12 or 13 of bar G which will increase the distance between the fulcrum F and the bar and the velocity of the movement of the stump; but will decrease the power to move it which will not require to be so great after the stump has once been started from its bed.

This machine may also be used to remove buildings and other heavy bodies. The power may be applied to one or both ends of the lever, and the parts of the machine may be increased or diminished in size at pleasure. The lever or truck-axle E may be made as represented of a straight bar perforated horizontally with an oblong mortise to admit the ends of the shifting bars G G and fulcrum rod F on which it turns with journals on its ends for trucks or wheels and when at rest and before the shifting bars G G are inserted, forming a figure like the letter T; or it may be made without the wheels. The lever may also be constructed with the oblong mortise near one end of it and with or without a wheel and instead of the fulcrum rod passing into said mortise as above described it may be attached by a clevis to two short bars embracing the lever above and below and secured to it by short wedges passed through said bars and bearing against the edge of the lever above and below the mortise where it is faced with iron to prevent wearing—which wedges do not extend over the mortise thus allowing the shifting bars to move from one end of the mortise to the other without obstruction and leaving the lever unperforated with pin holes.

What I claim as my invention and which I desire to secure by Letters Patent is—

5  The combination of the perforated bars G G' with the axle E of the trucks, perforated in the manner described so as to allow of the bars G G' being shifted to produce greater or less leverage the axle being attached at its center to the stump by a rod 10 A or other similar means as described.

ELEAZER MARBLE.

Witnesses:
    AARON NEWELL,
    WM. T. MIDDAUGH.